March 23, 1926.
E. H. HANEY
1,578,082
SPEED WARNING AND INDICATING DEVICE
Filed Feb. 25, 1924    2 Sheets-Sheet 1
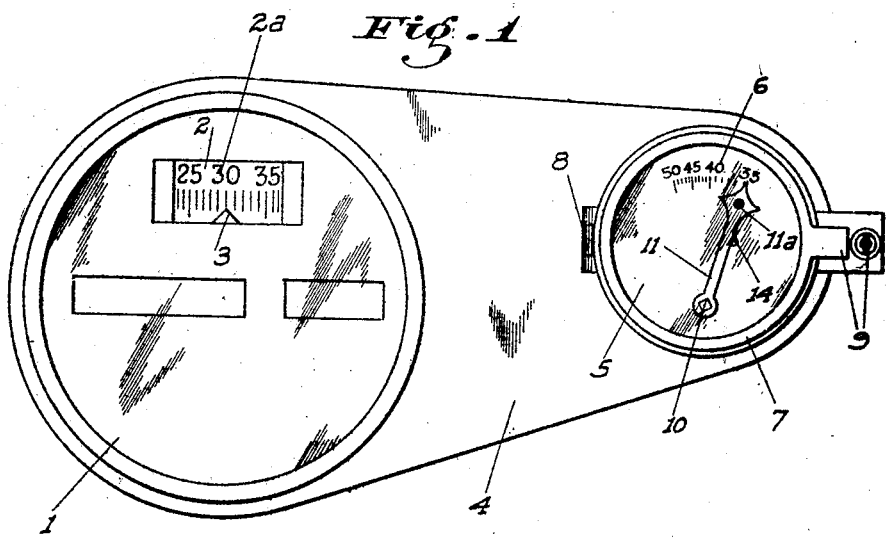
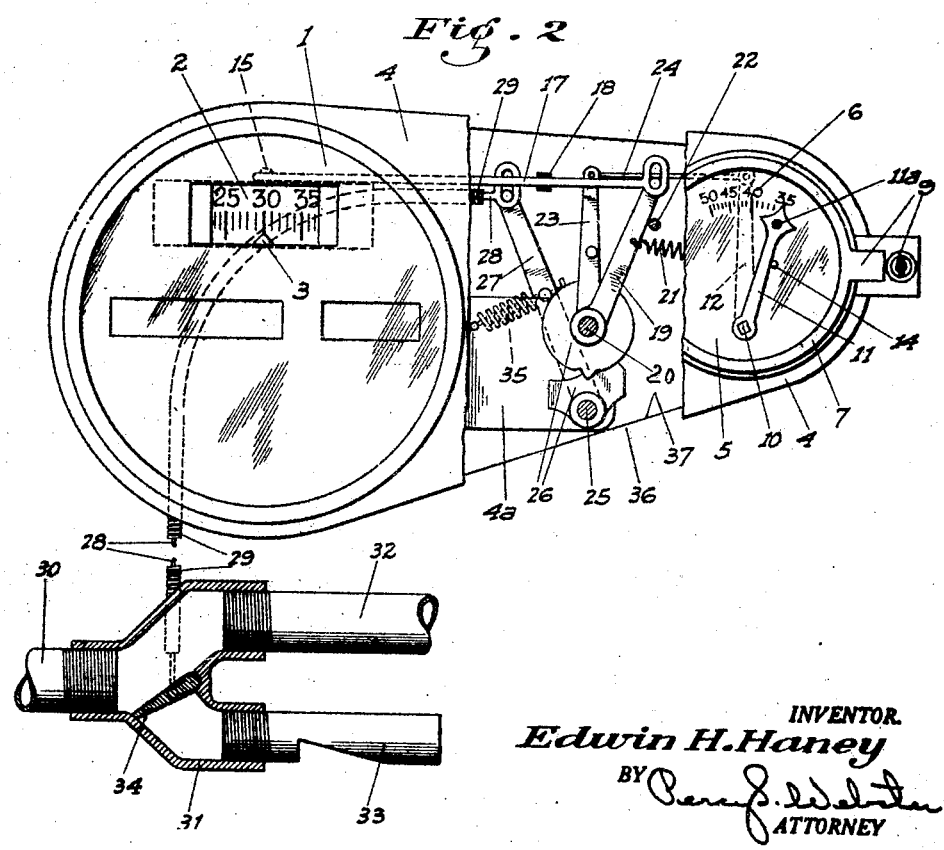
INVENTOR.
Edwin H. Haney
BY
ATTORNEY

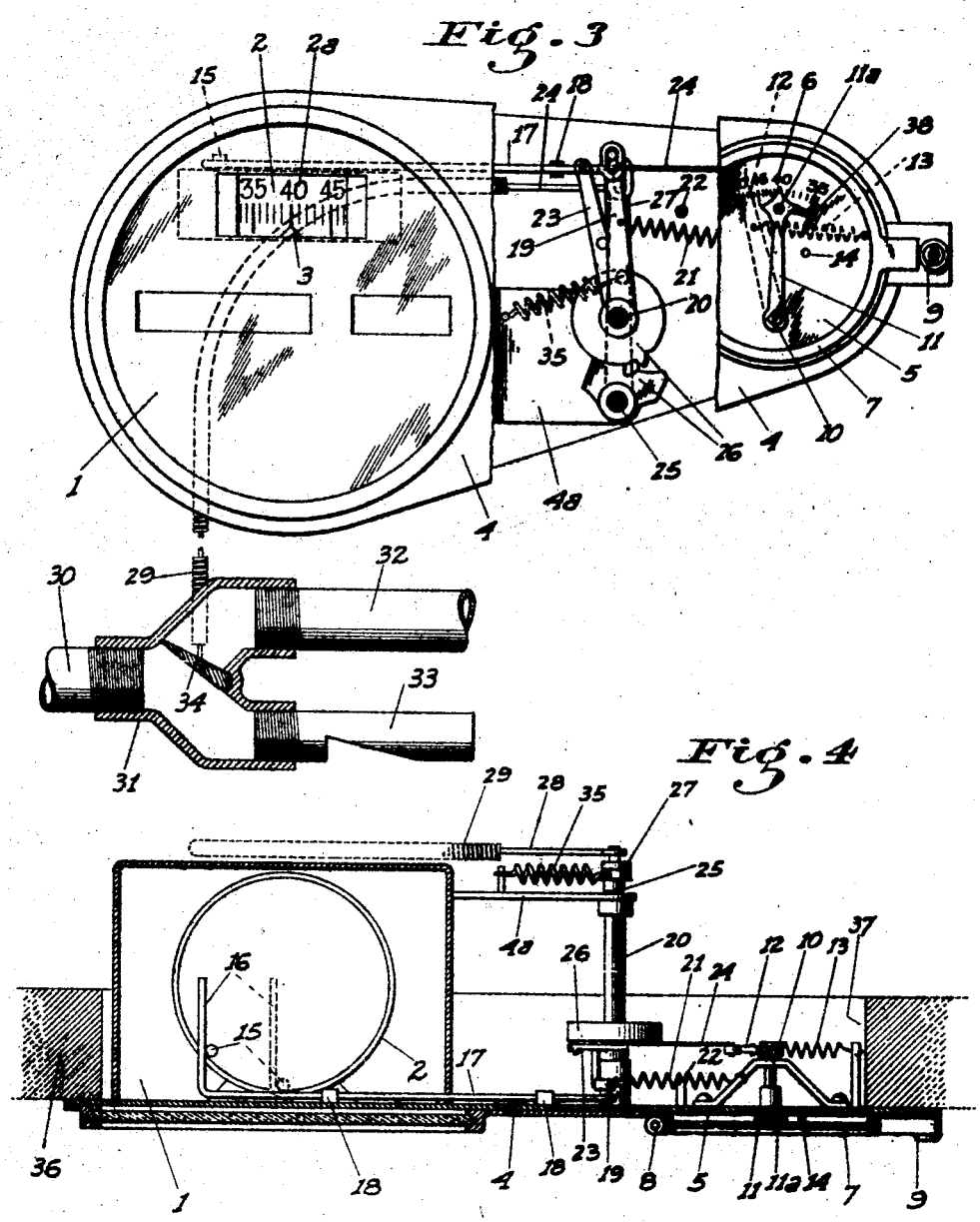

Patented Mar. 23, 1926.

1,578,082

UNITED STATES PATENT OFFICE.

EDWIN H. HANEY, OF SAN BERNARDINO, CALIFORNIA.

SPEED WARNING AND INDICATING DEVICE.

Application filed February 25, 1924. Serial No. 694,834.

*To all whom it may concern:*

Be it known that I, EDWIN H. HANEY, a citizen of the United States, residing at San Bernardino, county of San Bernardino, State of California, have invented certain new and useful Improvements in Speed Warning and Indicating Devices; and I do declare the following to be a full, clear, and exact description of the same, reference being had to the accompanying drawings, and to the characters of reference marked thereon, which form a part of this application.

This invention relates to improvements in motor vehicle equipment, my principal object being to provide a device, to be installed on a motor vehicle, by means of which an audible signal will be given when the vehicle exceeds a certain speed, and a permanent record of any such excessive speed will also be made.

If the installation of such a device on vehicles is made compulsory, it will I believe greatly reduce the present tendency of drivers to unlawfully speed, and will correspondingly reduce the number of accidents occasioned by such speeds.

The device is arranged so that the driver cannot cause it to fail to function while he is operating the car, and the permanently recorded speed indicating member cannot be removed by other than some one having regularly constituted or government authority.

The fact that an audible signal is first given, which may be readily heard by anyone within a reasonable distance, will call the attention of the officers to the car from which the signal is emanating, and will prevent the driver from escaping the consequences of his lawbreaking, as is now frequently done owing to the mental computation of speed of the average witness being unreliable, and to the fact that visual evidence of speed is the only kind that can now be had.

Apart from this, the permanent record of the speed obtained will be irrefutable evidence which will nullify all attempts of the motorists to deny breaking the law.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a face view of the permanent speed-record dial, arranged in connection with a speedometer.

Fig. 2 is a similar view, partly broken away to show the operating mechanism, and also showing the audible signal operated thereby, all parts being in their normal or inoperative positions.

Fig. 3 is a similar view, with the audible signal and permanent record means in operation.

Fig. 4 is a top plan view of the device, partly in section, the mechanism being in the positions shown in Fig. 3.

Referring now more particularly to the characters of reference on the drawings, the numeral 1 denotes a speedometer of common form as used on motor vehicles, and having the circular, rotating and speed denoting dial 2, the markings 2ª on the periphery of this dial cooperating with a fixed pointer 3 on the speedometer. This form of dial is common to most present day speedometers, and the means for rotating the same being standard construction in such speedometers, it is unnecessary to go into details as to said means.

Positioned to one side of the speedometer and preferably mounted as a unit therewith by means of a face plate 4 is a removable but stationary dial 5 having speed denoting marks 6 thereon reading from a certain predetermined speed limit upwardly, from right to left. This dial is enclosed in a glass-faced case 7 mounted on the face plate 4 by means of hinges 8, cooperating key-lock means 9 being provided with said plate and case opposite the hinges of the latter. Thus the dial 5 can only be removed by unlocking and throwing back the case 7.

A shaft 10 is turnably mounted on the plate 4 and projects through dial 5. A finger 11 is removably mounted on said shaft between the case and dial, just as the hand of an ordinary clock is mounted on its shaft, and points to the markings 6 on the latter. A crayon 11ª or the like projects from the finger toward the dial and bears thereagainst.

On the inner end of said shaft, behind plate 4, is fixed an arm 12, which is pulled toward the right by a spring 13 to cause the finger 11 to normally point to the lowest number on the dial 5, a stop pin 14 preventing movement of said finger beyond or to the right of said low number.

Fixed on and projecting upwardly from the rotating dial 2 in vertical alinement with a predetermined speed denoting mark thereon is a pin 15 adapted to abut with an increase of speed beyond that denoted by said mark against an extension 16 formed on one end of and at right angles to a horizontal rod 17 lying parallel to the plate 4 behind the same and slidable through guides 18 mounted on the latter. Said rod 17 extends toward dial 5, and is connected at its end nearest thereto to the upper end of an arm 19 fixed at its lower end on a shaft 20, journaled in the plate 4 and in an additional plate 4ª therebehind, said arm and rod being normally drawn toward the right by spring means 21 and its movement in such direction being limited by a stop pin 22.

After said arm 19 has moved away from said stop pin a certain distance it engages and causes the rotation of an arm 23 turnably mounted on the shaft 20, the arms 23 and 12 being connected to move simultaneously by a link 24.

Positioned below shaft 20 and also journaled in plates 4 and 4ª is another shaft 25, said shafts being connected in driving relation by means of gearing 26 of the well-known "Geneva movement" form.

This gearing is so designed and arranged to cause a rotation of the shaft 25 for a certain extent with the initial rotation of the driving or master shaft 20, and to then lock and prevent further movement of said shaft 25 while permitting continued rotation of the shaft 20.

Fixed on the shaft 25 is an arm 27, to whose upper end is connected a flexible wire or rod 28 housed in a tubing 29, the arm 27 being so located that the tubing will lie behind the speedometer 1.

The main exhaust pipe 30 from the engine of the vehicle has interposed therein, ahead of the muffler, a branch or Y fitting 31. To one branch the after portion 32 of the exhaust pipe is connected, while a whistle 33 of suitable type is connected to the other branch.

A valve or gate 34 is pivoted in the fitting 31 at the apex thereof, or opposite to the main pipe 30, said gate is movable to either allow a passage of gas between the pipes 30 and 32, or between pipe 30 and whistle 33. This gate is normally in the first named position, and is connected to the lower end of the wire 28 to move with the movement of the arm 27.

Arranged in connection with the arm 27 is a tension spring 35, fixed at one end on the plate 4ª and having a slip-connection with said arm so that the spring does not become effective until after the arm has moved from its normal or at rest position through a certain arc.

The plate 4, with the parts attached thereto as a unit, is mounted on the dashboard 36 of the vehicle, said dashboard being cut away as at 37 to allow the parts to project therethrough, said plate overlapping the edges of the cut away portion and concealing the same.

The operation of the device is as follows:

Assume that the speed limit allowed before any functioning of the device takes place is 30 miles per hour.

The pin 15 will therefore be mounted on the dial 2 above the 30 mile mark thereon, and the member 16 will be substantially in alinement with said mark when the rod 17 and parts connected thereto are in their normal positions, as shown in Fig. 2.

As soon as the speed is increased beyond 30 miles, the member 16 is moved along by the pin 15 on the moving dial 2, causing the rod 17 and arm 19 to be moved, and the shaft 20 to be turned.

This turning of the shaft 20 will impart a rotation in the opposite direction to the shaft 25 by reason of gearing 26, and the arm 27 on said shaft will move and pull on wire 28, causing the gate 34 to be moved from its exhaust line to its whistle opening position as shown in Fig. 3.

The parts are designed to cause the movement of the gate to be completed when a speed of about 35 miles is attained though of course a sound will be emitted from the whistle almost at the commencement of opening movement of the gate. Also as soon as the gate is thus fully shifted, the shaft 25 has been rotated as much as it can be and is then locked from further rotation by means of the Geneva movement device 26.

When the gate 34 is about half way between its limits of movement when moving in the above named direction, the spring 35 takes hold and tends to resist further movement.

Such resistance is overcome however both by the pressure of the pin 15 against the member 16 operatively connected to said gate, and also by the pressure of the exhaust gas then acting against the gate to cause the same to move to its full whistle-opening position. Up to this time however, the arm 23 is not disturbed, and no permanent record of the speed so far attained is had. The motorist may then run his car at such speed with no evidence, after he has again slowed down, to indicate that he has exceeded the speed limit. The whistle will continuously blow however until the speed is reduced below 30 miles, giving warning to anyone within hearing that a speeding car is near.

A leeway of five miles increase in speed over the predetermined limit is thus given drivers before any permanent record of their speed is made. This allows the driver to put on a temporary burst of speed when passing another car on the road, in which case the sound of the whistle obviates the need of the driver blowing his sometimes weak horn to warn the driver of the car to be passed of his approach.

Now as soon as a speed of 35 miles is reached, the arm 19 engages the arm 23, and with any further movement of the arm 19 had with an increase of speed beyond 35 miles, the arm 23 will be moved also.

Such movement will be imparted to the finger 11 of the dial 5 by reason of the connecting means 24 and 12 between said finger and arm 23.

Therefore as the finger 11 moves across the dial from its initial starting position at the 35 mile limit, the crayon or marker 11ᵃ carried by the finger will leave a permanent mark on the dial as at 38, this mark extending from the low speed limit to a point directly in line with that one of the dial markings 6 which denotes the highest speed obtained.

Since this dial can only be removed upon the opening of the enclosing case 7, to which only a police or other official has the key, it will be seen that the driver cannot destroy this evidence of speeding once it is made.

It is to a driver's advantage however to himself obtain a new dial as soon as possible after recording such a mark, since otherwise this high speed record might be used as evidence against him in some suit for damages as the result of a collision, when he was as a matter of fact well within the law at that particular time.

Upon the driver reducing his speed from the high point reached as above described, the dial 2 will turn in the opposite direction to that first had, withdrawing the pin 15 from the member 16 and permitting the latter and the parts connected thereto and controlled thereby to move to their normal positions. The spring 21 imparts such movement to the arm 19 and the spring 13 to the arm 12.

Between the 35 and 30 mile limits, the shaft 25 will be again rotated, causing the movement of the gate 34 connected thereto to shut off the whistle 33. During the initial movement of the gate, the spring 35 will aid in moving the same, or about until the gate has been turned to a central position or one in which the gas pressures thereagainst are equalized. Then with but a short movement of the gate beyond such central location, imparted thereto by reason of the spring 21, the gas pressure will then act as an aid to the finishing of the whistle closing movement.

As soon as the 30 mile speed is again reached, all parts are returned to their normal at rest positions.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A speed recording device for motor vehicles comprising a recording device, a speedometer having a movable element whose movement is controlled by the speed of the vehicle, a mechanism moved by the moving of said element after the vehicle has exceeded a predetermined limit of speed, and means actuated by said mechanism only after a certain movement thereof has taken place for operating the recording device.

2. A speed recording device for motor vehicles comprising a recording device, a speedometer having a circular and rotatable speed indicating dial, a pin fixed on and projecting from said dial, a member engageable by said pin and moved thereby with the rotation of the dial when the vehicle is moving at a speed in excess of a predetermined limit, and means controlled by the moving of said member for causing a record of the speed attained to be made by the recording device.

3. A speed recording device for motor vehicles comprising a recording device, a speedometer having a circular and rotatable speed indicating dial, a pin fixed on and projecting from said dial, a member engageable by said pin and moved thereby with the rotation of the dial when the vehicle is moving at a speed in excess of a predetermined limit, and means controlled and actuated only after said member has moved a certain distance for operating the recording device.

4. An excess speed recording device for a motor vehicle, such vehicle having a standard speedometer carrying a movable element, including a lever, means between the lever and the movable element for moving said lever in conjunction with the element, a movable recording element, and means whereby the recording element will only be moved after the lever has moved a certain distance.

5. An excess speed recording device for a motor vehicle, such vehicle having a speedometer carrying a movable element, including a lever, means between the lever and the movable element for moving said lever in conjunction with the element, a movable recording element, a lever connected to the recording element and means between said levers whereby the last named lever will be moved only after a certain movement of the first named lever has taken place.

In testimony whereof I affix my signature.

EDWIN H. HANEY.